Nov. 20, 1951     E. R. PRICE     2,575,891
TRANSMISSION CONTROL MECHANISM
Original Filed Dec. 31, 1941
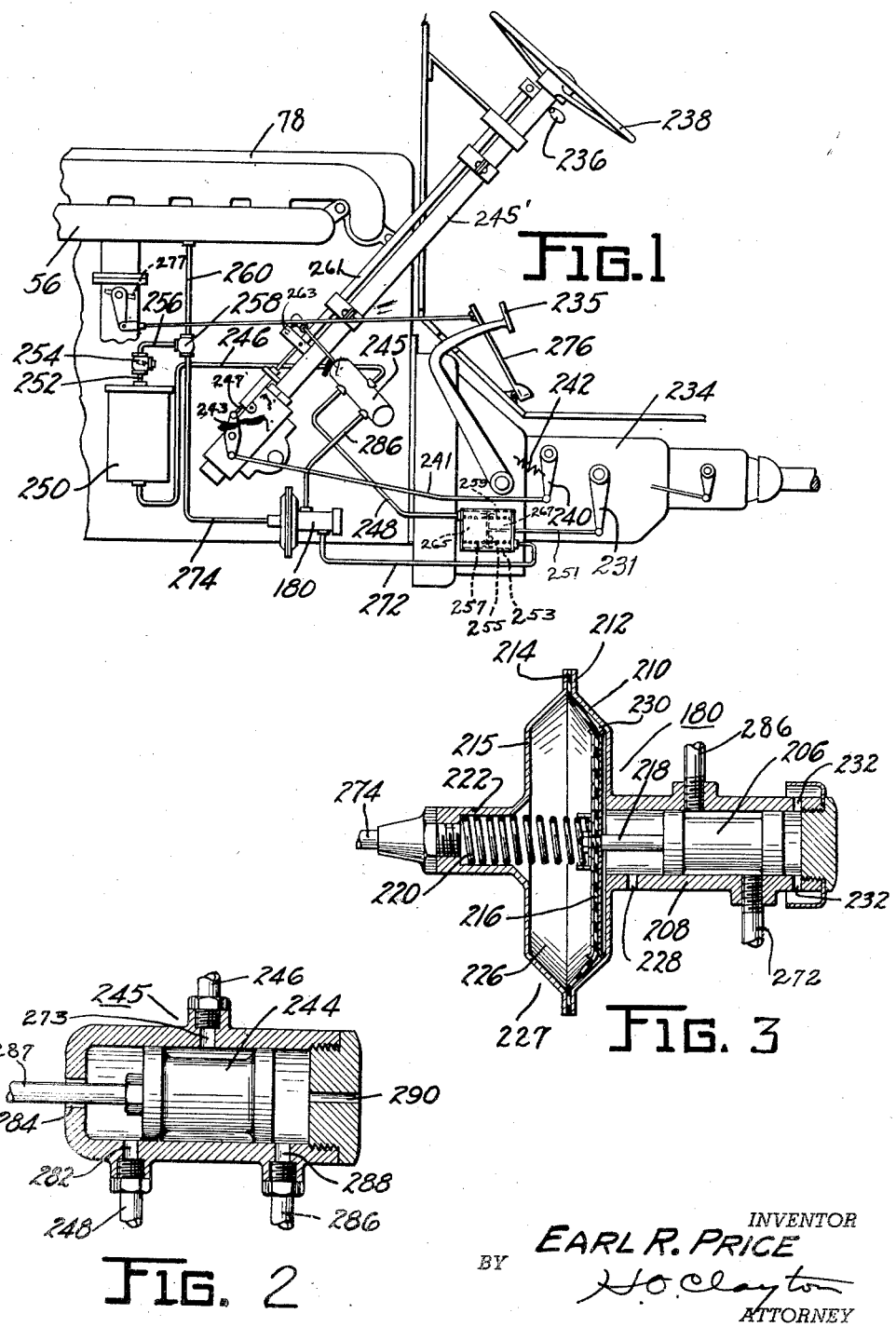
INVENTOR
EARL R. PRICE
BY
H. O. Clayton
ATTORNEY Patented Nov. 20, 1951

2,575,891

UNITED STATES PATENT OFFICE 2,575,891

TRANSMISSION CONTROL MECHANISM

Earl R. Price, South Bend, Ind., assignor to Bendix Aviation Corporation, South Bend, Ind., a corporation of Delaware Original application December 31, 1941, Serial No. 425,113, now Patent No. 2,373,259, dated April 10, 1945. Divided and this application December 1, 1944, Serial No. 566,120

4 Claims. (Cl. 74—472)

1

This invention relates in general to means for operating an automotive change-speed transmission and in particular to power means operable to effect a silent and smooth meshing of the gears in all operations of the transmission and irrespective of the speed of the vehicle.

A further object of the invention is to provide, in an automotive vehicle including an accelerator and an internal combustion engine having an intake manifold, power means for operating a standard three-speeds forward and reverse transmission, said power means including a manifold vacuum and spring operated valve operable, when the transmission is established in its high gear setting and the engine driven driving element of a change gear transmission is rotating at the same speed as the vehicle driven element of said transmission, to make possible an operation of said power means to establish the transmission in its second gear setting when and only when the manifold vacuum is decreased by opening the throttle to increase the speed of the engine and thereby operate said valve, the opening of the throttle also serving to increase the speed of the engine driven element of the transmission.

A further object of the invention is to provide, in an automotive vehicle including an internal combustion engine having an intake manifold, an accelerator and a three-speeds forward and reverse transmission which may include a synchronizing mechanism, power means for operating said transmission, the operation of said power means being controlled by a manually operated selector valve, a power operated control valve and by the operation of the internal combustion engine, the latter being in part controlled by the accelerator.

Yet another object of the invention is to provide, in an automotive vehicle having an internal combustion engine, an accelerator and a three-speeds forward and reverse transmission, a double-acting double-ended spring and vacuum operated motor operably connected with the transmission, said motor being so controlled by a manually operated selector valve, a power operated three-way valve and the accelerator as to effect the high gear setting of the transmission when the selector valve is moved to a certain position and the accelerator is released to idle the engine; and to effect the second speed setting of said transmission when the selector valve is moved to a certain position and the accelerator is first released and then depressed.

My invention also contemplates the provision

2 of the aforementioned power means for operating the three-speeds forward and reverse transmission of an automotive vehicle, said vehicle being equipped with clutch means incorporated in the power plant and connecting the engine with the change-speed transmission, said clutch means including a friction clutch and a fluid coupling.

Yet another object of my invention is to provide, in an automotive vehicle including a standard three-speeds forward and reverse transmission, power means for operating said transmission comprising a motor for establishing said transmission in any one of its four settings or neutralizing the transmission and means for controlling the operation of said power means including a manually operated shift lever mounted adjacent the steering wheel of the vehicle, a four-way selector valve operated by said shift lever and a power operated three-way valve said valves cooperating with the accelerator to control the operation of the power means.

Other objects of the invention and desirable details of construction of parts will become apparent from the following detailed description of one embodiment of my invention, taken in conjunction with the accompanying drawings illustrating said embodiment, in which:

Figure 1 is a diagrammatic view disclosing the transmission operating mechanism constituting a preferred embodiment of my invention;

Figure 2 is a sectional view disclosing the details of the shift lever operated four-way selector valve constituting a part of the transmission operating mechanism disclosed in Figure 1; and Figure 3 is a sectional view disclosing in detail the pressure differential and spring operated synchronizer valve of the transmission operating mechanism disclosed in Figure 1.

Referring now to Figure 1 disclosing a preferred embodiment of my invention, a three-speeds forward and reverse transmission 234 of standard design is established in either its reverse gear setting or its low gear setting by the operation of a crank 231 after a crank 240 has been actuated to effect the cross shift operation of said transmission. The force transmitting means for operating the crank 240 includes a rod 241 connected to said crank, a lever 243 pivotally mounted on a part of the steering post 245' and a shaft 247 connected to a manually operated shift lever 236, mounted on the steering post beneath the steering wheel 238. The cross shift operation of the transmission, that is the operation preparatory to effecting either a low gear or reverse gear setting of the transmission, is effected by the physical effort of the driver, the parts of the aforementioned force transmitting means being so constructed and arranged that to effect the cross shift operation the driver lifts the shift lever 236 upwardly toward the steering wheel against the tension of a spring 242 which biases the crank 240 to a position preparing the transmission for either a second or high gear setting.

Describing now the transmission operating power means of my invention the crank 231 is connected, by a rod 251, to a double-acting double-ended spring and vacuum operated motor 253. This motor, which is conveniently mounted near or upon the transmission, includes a double-ended casing which houses a power element 255 and two transmission neutralizing springs 257 and 259. An air transmitting conduit 248 is connected to one end of the casing and another air transmitting conduit 272 is connected to the other end of the casing.

The valvular means for controlling the operation of the motor 253 constitutes an important feature of my invention and includes a shift lever actuated four-way selector valve 245 shown in detail in Figure 2 and a power operated three-way valve 180, Figure 3, said valves cooperating with an operation of the shift lever and accelerator to control the operation of the transmission.

Referring to Figure 2 there is here disclosed in detail the four-way selector valve 245, the same preferably comprising a two-part casing ported at 273, 282, 288 and 290. The casing is provided with bosses adjacent the ports 273, 282 and 288, said bosses having secured thereto conduit 246 and the aforementioned conduits 248 and 286 respectively. A spool shaped valve member 244 operated by a rod 287 extending through an opening 284 in the valve casing serves, depending of course upon its position with said casing, to place one or the other of the conduits 248 and 286 in fluid transmitting connection with the conduit 246, the latter conduit being preferably connected at its other end to a vacuum storage tank 250 said tank being connected, by conduits 252, 256 and 260 with the intake manifold 56 of the internal combustion engine 78 of the vehicle. If desired, a check valve 254 may interconnect the conduits 252 and 256. The tank 250 may be omitted in which case the conduit 246 would be connected directly with the conduit 274.

Referring to Figure 3 there is here disclosed in detail the aforementioned power operated three-way valve unit 46. This valve unit includes a casing member 208 enlarged at one of its ends to provide a casing member 210 constituting one half of a motor casing. A casing member 215 secured to the casing member 210 constitutes the other half of the motor casing, the members 210 and 215 having secured therebetween a power element 216 which is biased to the position disclosed in Figure 3 by a spring 220. The aforementioned conduit 274 is connected at one of its ends to a tubular shaped end portion 222 of the casing member 215 thereby providing air transmitting means interconnecting the intake manifold 56 and a compartment 226 of the valve operating motor indicated as a whole by the reference numeral 227. The casing member 208 houses a spool shaped valve member 206 connected to the power element 216 by a rod 218 and said casing member is ported to receive respectively the aforementioned conduit 286 connected to the selector valve 245 and the conduit 272 connected to the aforementioned shift motor 253.

Describing now the operation of the transmission operating mechanism constituting my invention and incidentally completing the description of certain parts thereof not heretofore referred to, it will be assumed that the transmission is in neutral by virtue of the operation of one or the other of the springs 257 and 259 and that the car is at a standstill with the engine dead.

The friction clutch of the power plant is then manually disengaged by the operation of a clutch pedal 235 whereupon the engine is cranked thereby partially evacuating the vacuum tank 250. Assuming that the driver wishes to establish the transmission in its low gear setting, he then rotates the shift lever 236 in a plane perpendicular or substantially perpendicular to the plane of the steering wheel thereby rotating the cranks 243 and 240; and this operation effects the cross shift operation of the transmission. The shift lever is then rotated clockwise in a plane parallel or substantially parallel to the plane of the steering wheel, this operation serving to move the valve member 244 of the selector valve member 245 to the left, Figure 2. As disclosed in Figure 1 the clockwise rotation of the shift lever 24 serves to rotate a shaft 261 clockwise about its longitudinal axis thereby rotating a crank 263 clockwise to effect the aforementioned leftward movement of the valve member 244. The rod 287 for moving the latter member is pivotally connected at one of its ends to the crank 263.

The conduits 246 and 248 are by this operation of the selector valve placed in air transmitting connection with each other, accordingly, a compartment 265 of the motor 253 is connected to the source of vacuum; and a compartment 267 of said motor is at this time vented to the atmosphere via the conduit 272 and ports 232 in the casing of the power operating three-way valve unit 180 Figure 3. Now it is to be remembered that the engine 78 is at this time idling thereby making of its intake manifold a source of vacuum and said manifold is connected to a compartment 226 of the valve operating motor 227 by the conduit 224. A compartment 230 of the said motor is at all times vented to the atmosphere via a port 228 in the valve casing 208. It follows therefore that with the engine idling, the power element 216 of the motor 227 is subjected to a differential of pressures resulting in the movement of said power element to the left, Figure 3, to vent the compartment 267 of the motor 253 to the atmosphere via the conduit 272 and the ports 232 in the valve casing. The motor 253 is thus vacuum energized to establish the transmission in its low gear setting, the power element 255 being subjected to a differential of pressures to move the same to the left, Figure 1.

The driver will then get the car under way by engaging the friction clutch and concurrently depressing the accelerator 276 to open the throttle 277 of the engine 78.

The car being under way in low gear, the driver, to establish the second gear setting of the transmission, will release the accelerator to reverse the engine torque, disengage the clutch by manually depressing the clutch pedal, and rotate the shift lever 236 counterclockwise to move the selector valve 244 to its transmission neutral position disclosed in Figure 2; and this operation serves to vent the compartment 265 of the motor 253 to the atmosphere via the opening 284 in the selector valve casing and the conduit 248. Now when the compartment 265 of the motor 253 is vented to the atmosphere the neutralizing spring 278 expands to move the power element 255 of the said motor to neutralize the transmission; and this operation is facilitated by the aforementioned disengagement of the clutch.

The transmission having been neutralized as a result of the moving of the valve member 244 to its transmission neutralizing position and a disengagement of the clutch, the next operation of the mechanism is automatically effected by the spring 242 which rotates the crank 240 to prepare the transmission for either a second or high gear operation. The driver will then probably continue the counterclockwise rotation of the shift lever to move the valve member 244 to its second gear position; and this operation, as will be noted from a study of the drawings, serves to connect the compartment 267 of the motor 253 with the power operated control means, that is, the vacuum cut-in valve 180. The compartment 265 is, at the time, vented to the atmosphere as a result of the above described transmission neutralizing operation of the mechanism.

Coming now to one of the most important features of my invention it is apparent that the motor 253 will not be vacuum energized to establish the transmission in its second gear setting until the accelerator is depressed to (1) increase the engine speed to thereby synchronize the transmission gears to be meshed and (2) increase the gaseous pressure in the compartment 226 of the motor 227. With the latter operation the valve member 206 is moved to the position disclosed in Figure 3 thereby making possible the vacuum energization of the motor 253 to establish the transmission in its second gear setting.

There is thus provided in the power operated three-way cut-in valve 180, means for effecting a vacuum energization of the motor 253 to establish the transmission in its second gear setting when and only when this operation should be effected; for if the motor 253 were vacuum energized before the gears to be meshed were synchronized then the gears would be unduly worn; furthermore this energization of the motor would result in a noisy operation of the transmission.

The transmission having been established in its second gear setting the accelerator is operated to increase the speed of the vehicle. The establishment of the transmission in its high gear setting is practically the same as the previously described low gear setting operation of the transmission operating power means. It is to be noted however, that with this high gear setting operation of the power means the gears of the transmission will not mesh until the speed of the engine driven driving gear of the transmission is lowered to its synchronous speed; and this is effected by the release of the accelerator to lower the engine speed.

There is thus provided a simple and compact power means for operating the standard three-speeds forward and reverse transmission of an automotive vehicle.

This application constitutes a division of my U. S. Patent No. 2,373,259, dated April 10, 1945.

Although this invention has been described in connection with a certain specific embodiment of my invention the principles involved are susceptible of numerous other applications that will readily occur to persons skilled in the art. The invention is, therefore, to be limited only as indicated by the scope of the appended claims.

I claim:

1. In an automotive vehicle provided with an internal combustion engine having an intake manifold, an accelerator and a change speed transmission, power means for operating said transmission comprising a double-acting motor including a double-ended casing and a power element, said element together with the casing providing two motor compartments, a selector valve for in part controlling the operation of said motor, a power operated control valve for in part controlling the operation of said motor, air transmitting means interconnecting the manifold and selector valve, air transmitting means interconnecting said latter valve with one compartment of said motor, air transmitting means interconnecting the other compartment of said motor with said control valve and air transmitting means interconnecting the control valve with the selector valve.

2. In an automotive vehicle provided with an internal combustion engine having an intake manifold, an accelerator and a change speed transmission, power means for operating said transmission comprising a double-acting motor including a double-ended casing and a power element, said element together with the casing providing two motor compartments, a selector valve for in part controlling the operation of said motor, a power operated control valve for in part controlling the operation of said motor, a differential pressure operated motor for actuating the latter valve, air transmitting means interconnecting the manifold and selector valve, air transmitting means interconnecting said latter valve with one compartment of said motor, air transmitting means interconnecting the other compartment of said motor with said control valve, air transmitting means interconnecting the control valve and selector valve and air transmitting means interconnecting the control valve operating motor with the first mentioned air transmitting means.

3. In an automotive vehicle provided with a power fluid source, a three-speeds forward and reverse transmission mechanism including two cranks, the operation of one of said cranks serving to effect a cross shift operation of the transmission and the operation of the other of said cranks serving to establish the transmission in the desired gear ratio setting, power means for operating the latter crank including a double-acting spring and pressure differential operated motor, a selector valve for controlling the flow of power fluid into and from said motor, a power operated control valve cooperating with the selector valve in controlling the flow of power fluid into and from one end of said motor said valves serving to control the operation of said motor, power fluid transmitting means interconnecting the valves with the power fluid source, power fluid transmitting means interconnecting the selector valve with one end of the motor and other power transmitting means interconnecting the power operated valve and the selector valve with the other end of the motor and a manually operated selector lever for actuating the first mentioned crank and for actuating the selector valve.

4. Power means adapted to be used as means for operating a change speed transmission of an automotive vehicle said power means including a double acting motor operable to establish the transmission in any one of its settings, and means for controlling the operation of said motor including a selector valve operable to connect one or the other end of the motor with a source of power and at the same time connect the other end of the motor with the atmosphere, a fluid transmitting connection adapted to connect the selector valve with a source of power, a fluid transmitting connection interconnecting the selector valve with one end of the motor, a fluid transmitting connection interconnecting the valve with the other end of the motor, and a valve for controlling the power fluid passing through the latter connection to thereby control one of the operations of the motor.

EARL R. PRICE.

REFERENCES CITED

The following references are of record in the file of this patent:

UNITED STATES PATENTS

| Number | Name | Date |
| --- | --- | --- |
| 2,079,654 | Linsley | May 11, 1937 |
| 2,094,449 | Forichon | Sept. 28, 1937 |
| 2,129,083 | Carter et al. | Sept. 6, 1938 |
| 2,175,152 | Hey | Oct. 3, 1939 |
| 2,177,662 | Kleisrath et al. | Oct. 31, 1939 |
| 2,239,463 | Brewer | Mar. 11, 1941 |
| 2,275,944 | Breese | Mar. 10, 1942 |
| 2,303,937 | Clayton et al. | Dec. 1, 1942 |